United States Patent
Boisset

(10) Patent No.: US 11,072,212 B2
(45) Date of Patent: Jul. 27, 2021

(54) METHOD OF DETECTING A CHANGE IN THE POSITION OF A WHEEL UNIT HELD ON AN ASSOCIATED WHEEL OF A MOTOR VEHICLE

(71) Applicants: Continental Automotive France, Toulouse (FR); Continental Automotive GmbH, Hannover (DE)

(72) Inventor: Jean-Philippe Boisset, Toulouse (FR)

(73) Assignees: Continental Automotive France; Continental Automotive GmbH

( * ) Notice: Subject to any disclaimer, the term of this patent is extended or adjusted under 35 U.S.C. 154(b) by 0 days.

(21) Appl. No.: 17/056,868

(22) PCT Filed: May 24, 2019

(86) PCT No.: PCT/FR2019/051200
§ 371 (c)(1),
(2) Date: Nov. 19, 2020

(87) PCT Pub. No.: WO2019/229338
PCT Pub. Date: Dec. 5, 2019

(65) Prior Publication Data
US 2021/0146736 A1   May 20, 2021

(30) Foreign Application Priority Data
May 31, 2018   (FR) ...................................... 1854688

(51) Int. Cl.
*B60C 23/04*   (2006.01)

(52) U.S. Cl.
CPC ........ *B60C 23/0416* (2013.01); *B60C 23/045* (2013.01)

(58) Field of Classification Search
CPC .. G01M 17/02; G01M 17/021; G01M 17/022; G01M 17/027; G01M 17/025;
(Continued)

(56) References Cited

U.S. PATENT DOCUMENTS

| 8,396,629 | B1 * | 3/2013 | Kim | ...................... G01M 17/02 701/41 |
| 2005/0188755 | A1 * | 9/2005 | Cargould | ............ G01M 17/021 73/146 |

(Continued)

FOREIGN PATENT DOCUMENTS

| DE | 102005011133 A1 | 9/2006 | |
| DE | 102012105030 A1 * | 12/2012 | ......... B60C 23/0416 |

(Continued)

OTHER PUBLICATIONS

English Translation of the Written Opinion for International Application No. PCT/FR2019/051200, dated Oct. 16, 2019; 6 pages.
(Continued)

*Primary Examiner* — Andre J Allen
(74) *Attorney, Agent, or Firm* — RatnerPrestia

(57) ABSTRACT

A method for detecting a change in position of a wheel unit of a wheel on a motor vehicle, a position of each wheel unit having been identified and stored. Communication between each wheel unit and at least one control device takes place in accordance with a standard allowing the bidirectional exchange of UHF wave signals, each wheel unit performing scanning to intercept the signals sent by a given wheel unit whose signature is established by the wheel unit performing the scanning in accordance with a detected average power value. Current and starting signatures are compared. If the current signature differs by more than an experimentally determined percentage from its starting signature for a given wheel unit, a change in position of one of the two wheels is detected.

13 Claims, 3 Drawing Sheets

(58) Field of Classification Search
CPC .... G01M 17/024; G01M 17/10; G01M 1/045; G01M 7/08; G01M 17/0076; G01M 17/013; G01M 17/03; G01M 17/04; G01M 17/06; G01M 17/08; G01M 1/02; G01M 1/12; G01M 1/16; G01M 1/225; G01M 3/04; G01M 3/40; G01M 5/0091; G01M 7/02; G01M 99/00; G01M 99/002
USPC .................................................. 73/146–146.8
See application file for complete search history.

(56) References Cited

U.S. PATENT DOCUMENTS

| | | | |
|---|---|---|---|
| 2006/0226966 A1 | 10/2006 | Jost | |
| 2008/0143503 A1* | 6/2008 | Watabe | G01M 17/02 340/438 |
| 2012/0319831 A1* | 12/2012 | Maehara | B60C 23/0488 340/447 |
| 2017/0289732 A1 | 10/2017 | Guinart et al. | |
| 2018/0111430 A1* | 4/2018 | Muddiman | B60C 23/0416 |
| 2019/0063913 A1* | 2/2019 | Leone | G01M 1/28 |
| 2019/0187029 A1* | 6/2019 | Kanbayashi | G01M 17/025 |

FOREIGN PATENT DOCUMENTS

| | | | | |
|---|---|---|---|---|
| WO | WO-2009070064 A1 * | 6/2009 | ......... | B60C 23/0479 |
| WO | WO-2009070066 A1 * | 6/2009 | .......... | G01M 17/013 |
| WO | WO-2009070067 A1 * | 6/2009 | ......... | B60C 23/0416 |
| WO | 2016072831 A1 | 5/2016 | | |
| WO | WO-2019178629 A1 * | 9/2019 | ............. | G01B 21/24 |

OTHER PUBLICATIONS

International Search Report and Written Opinion for International Application No. PCT/FR2019/051200, dated Oct. 16, 2019, 11 pages (French).

International Search Report and Written Opinion for International Application No. PCT/FR2019/051200, dated Oct. 16, 2019, 7 pages.

* cited by examiner

METHOD OF DETECTING A CHANGE IN THE POSITION OF A WHEEL UNIT HELD ON AN ASSOCIATED WHEEL OF A MOTOR VEHICLE

CROSS REFERENCE TO RELATED APPLICATIONS

This application is the U.S. National Phase Application of PCT International Application No. PCT/FR2019/051200, filed May 24, 2019, which claims priority to French Patent Application No. 1854688, filed May 31, 2018, the contents of such applications being incorporated by reference herein.

FIELD OF THE INVENTION

The present invention relates to a method for detecting a change in position of a wheel unit carried by an associated wheel on a motor vehicle, a position of each wheel unit on the vehicle having been previously identified and stored in the respective wheel unit.

The present invention also relates to a method for locating a position of a wheel unit on a motor vehicle implementing such a detection method.

BACKGROUND OF THE INVENTION

Nowadays, it is known to mount, in each wheel of a motor vehicle, a wheel unit for monitoring certain parameters of said wheel. Such a wheel unit is commonly denoted using the term "TPMS module", for "Tire Pressure Monitoring System". Such a wheel unit, the data of which are transmitted to a computer on board the vehicle as monitoring and/or control unit, makes it possible for example to measure the pressure of the tire as well as its temperature.

As a motor vehicle comprises a plurality of wheels, it is necessary for the computer to identify the wheel unit of each wheel in order to allow it to determine the wheel to which the data correspond and thus be able to utilize said data. Each wheel unit therefore needs to locate the wheel in which the wheel unit is mounted. Such a location and association method is known to those skilled in the art by the name pairing.

In one existing solution, known by the name "localization with synchronized emissions" (LSE), it is known to use a wheel unit comprising an acceleration measurement sensor for each wheel.

When the wheels turn, the measurements performed by the acceleration measurement sensor allow the wheel unit to determine the time at which it is in a predetermined position, for example, at its maximum height, for which it then sends the computer a coded message in one or more signals.

In order to associate a wheel unit with a wheel of the vehicle, it is necessary to associate the signals received from each wheel unit with a parameter specific to each wheel. Now, when the vehicle is in motion, it is observed that each wheel turns at a different rotational speed from the others, in particular because some of the wheels may be of different diameters and they follow different trajectories on bends.

In the context of a wheel unit system controlled by a mobile telephone equipped with the appropriate application, the position of the wheel unit on the motor vehicle is achieved manually, for example by deflating the tire of a wheel, the wheel unit then transmitting an alert signal, thereby making it possible to detect the position of the wheel unit on the wheel. The position of the wheel unit on the wheel may also be detected by moving the mobile telephone closer to the wheel, in order to have a maximum signal transmitted by the wheel unit when the mobile telephone is as close as possible to the wheel unit.

The position of the wheel unit on the wheel is then stored in the wheel unit itself so that this position is available on demand to any new users of the system, without having to locate the wheel units again, this location being inconvenient.

However, it is difficult to know whether the stored position is still up to date, especially when changing wheels on the vehicle. It is specifically impossible to know whether or not the stored position has become incorrect.

SUMMARY OF THE INVENTION

The problem on which an aspect of the present invention is based is firstly that of detecting, at regular intervals, whether a position of a wheel unit on a wheel is still valid, and secondly that of being able, based on a reference wheel unit, to locate the positions of the wheels on the motor vehicle that are associated respectively with a wheel unit other than the reference unit.

To this end, an aspect of the present invention relates to a method for detecting a change in position of a wheel unit carried by an associated wheel on a motor vehicle, a position of each wheel unit on the vehicle having been previously identified and stored in the respective wheel unit, each wheel unit measuring at least one parameter of the associated wheel and communicating with at least one device for remotely monitoring and/or controlling the wheel units, noteworthy in that:

communication between each wheel unit and said at least one monitoring and/or control device takes place in accordance with a communication standard allowing the bidirectional exchange of data signals at very short distances using Bluetooth® UHF radio waves, each wheel unit being equipped with a scanning function allowing it to intercept the signals sent by a given wheel unit to said at least one monitoring and/or control device and to perform at least one measurement of a power value of each intercepted signal, a signature of a given wheel unit being established with respect to at least one other wheel unit on the basis of an average power value detected by said at least one other wheel unit established over a predetermined number of power value measurements of the signals sent by the given wheel unit and intercepted by said at least one other wheel unit, sufficient for the respective wheels of the two wheel units to be phase-offset, a check consisting in comparing, at regular intervals, a current signature averaged over the predetermined number of value measurements for the given wheel unit with respect to said at least one other wheel unit with a starting signature of the given wheel unit with respect to said at least one other wheel unit, this starting signature being established following the prior identification of the position of the given wheel unit on the vehicle, and, if the averaged current signature of the given wheel unit differs by more than an experimentally determined percentage from its starting signature with respect to said at least one other wheel unit, it is detected that one of the wheel units from among the given wheel unit and said at least one other wheel unit has changed position on the vehicle, the method being applied to each wheel unit becoming the given wheel unit.

The technical effect is that of regularly notifying a monitoring and/or control device that the stored position of a wheel unit is probably incorrect, since it is no longer up to date. Following a manual operation of detecting the position of the wheel units present on the vehicle, their positions are stored, manually or automatically, after the detection operation, directly on the wheel units themselves.

The advantage of writing the information to each respective wheel unit is that of allowing various users to be able to locate the wheel units of the system afterwards, without them having to carry out inconvenient location. However, in a multi-user context, it is difficult to know whether the position fed back is still up to date, for example when changing the position of a wheel on the motor vehicle.

Signals sent regularly by each wheel unit to the monitoring and/or control device or devices are utilized in such a way as to have them intercepted by one or more other what are known as reference wheel units in order to perform at least one measurement of a power value of each signal intercepted by this or these other reference wheel unit or units, without taking note of the intercepted signal. What is of interest in the context of an aspect of the present invention is not the content of the intercepted signals, but their power, which will characterize the transmitting wheel unit through a signature that will be monitored over time and regularly checked.

Scanning does not require a great deal of energy expenditure, nor does measuring the power value of each signal. An aspect of the present invention thus delegates the detection of a change in position of the wheel units to the wheel units themselves, this being a simplification of this detection.

A check on the position of the wheel units in a vehicle may be performed for example once a day or less.

A data exchange at very short distances using Bluetooth® UHF or microwave radio waves allows a bidirectional exchange of data using the same type of waves at reception as at transmission, and not radiofrequency waves in one direction and low-frequency waves in the other direction, thereby no longer requiring the use of different transmission and reception devices, which represents a saving in terms of resources.

Using a Bluetooth® standard also allows interaction with mobile telephones and future or pre-existing motor vehicle architectures that will centralize Bluetooth® communication for a plurality of vehicle systems, in particular for tire pressure monitoring systems, hands-free opening or starting systems and for various connection options in vehicles.

Although expanding for various communications used in a vehicle, such a standard has been barely used for communication between wheel units, on the one hand, and a remote monitoring and/or control device, on the other hand, due to high energy expenditure. There has not been any provision to make the wheel units communicate with each other in the prior art, each wheel unit corresponding directly with the monitoring and/or control device or devices.

An aspect of the present invention bestows on them a scanning function in order to intercept signals transmitted by a different given wheel unit and a function of measuring the power of the signal representative of the position of a given wheel unit in the vehicle with respect to one or more other reference wheel units that performed the scanning and the power measurements.

What hampered the development of a Bluetooth® protocol in the motor vehicle sector for wheel units was its energy expenditure, given the need to transmit signaling frames or beacons in order to allow possible connection, and to do so essentially in parking mode, which ultimately made the Bluetooth® protocol a greater consumer than a conventional radiofrequency system. Its advantage is its ease of scanning in order to intercept signals and the fact that this process takes place with the vehicle in motion.

An aspect of the present invention, by centralizing a large portion of the communications between wheel units, on the one hand, for the sole purpose of a power measurement, and wheel units with a remote monitoring and/or control device, on the other hand, this being the case for the majority of the communications, makes it possible to reduce energy consumption and makes it viable to use a Bluetooth® protocol for a tire pressure monitoring system in a vehicle. The signals between wheel units are signals that are already transmitted by a given transmitting wheel unit to the remote monitoring and/or control device or devices. There is therefore not necessarily any transmission of specific signals between wheel units for power measurements of the signals, but interceptions of signals already transmitted for another purpose.

The proposed solution consists in each wheel unit discovering nearby wheel units forming the system of the vehicle and associating, with each wheel unit, an average power field level corresponding to a starting signature of this element. This discovery should be performed immediately after writing the position of each wheel unit to the motor vehicle, as soon as the criteria for measuring a power field are valid, the motor vehicle being in motion.

The check between the starting signature and the current signature for a given wheel unit will be performed on a regular basis, once a day for example, for all of the wheel units of the system. If the discovery of the wheel units of the system changes or if the current signature is no longer consistent with the starting signature for a given wheel unit and therefore for the associated wheel, the driver of the motor vehicle will be notified of this.

In the case of a given signal-transmitting wheel unit associated with just one other reference wheel unit performing power measurements, there remains doubt as to which of the two wheel units could have moved. It is for this reason that it is advantageous to have a plurality of other reference units each performing power measurements after having simultaneously intercepted the same signals.

In order to establish an average of power signals regardless of the transmission and/or reception angle, it is necessary to have a large number of power value measurements of the signals sent by the given wheel unit and intercepted by said at least one other wheel unit. It is also necessary to perform measurements with intervals long enough to be sure that the two wheels are phase-offset.

The number of values required to form the average depends on the chosen option. If the transmission/reception angle is not taken into account, then a large number of values are needed to ensure that the transmissions/receptions are performed over almost all of the angles in order to have phase-offset wheels. To this end, it may be contemplated to perform the measurements over fairly long intervals.

If the transmission angle is defined or known, the number of transmission/reception angle pairs may be limited to approximately 4 for example.

Without being limiting, the percentage determined experimentally may be 10%. Advantageously, the current signature of a given wheel unit is compared respectively with its starting signature for at least two other wheel units, called first and second other wheel units, and, in the case of a change in position of a single wheel unit on the vehicle, if the current signature of the given wheel unit is different from its respective starting signature with respect to each of the first and second other wheel units, it is detected that the given wheel unit has changed position on the vehicle, whereas, if the current signature of the given wheel unit is different from its respective starting signature with respect to the first other wheel unit but different from its starting signature by less than the experimentally determined percentage with respect to the second other wheel unit, it is detected that the first other wheel unit has changed position on the vehicle. This means that the current signature for the given wheel measured by the second other wheel unit has not varied significantly with respect to the starting signature.

This makes it possible to save time and to check whether or not a reference wheel unit has moved, without needing to transmit signals, but due to its inconsistency with the conclusions of the other reference wheel unit.

Advantageously, the current signature of a given wheel unit is compared respectively with its starting signature for all of the other wheel units present on the motor vehicle.

In order to improve the consistency of the change in position detection, a detection performed by another reference wheel unit measuring the power of signals transmitted by a given wheel unit may be cross-correlated with other detections from other reference wheel units of the system. It may be contemplated for a confidence level to be able to be associated with the alert in the event that a plurality of other reference wheel units confirm a detection.

Advantageously, a confidence level is established that is proportional to a number of other wheel units present on the vehicle that have communicated the same detection of a change in position of a given wheel unit on the vehicle.

Advantageously, the comparison of the starting signatures and the current signatures for each wheel unit is processed by said at least one other wheel unit or by said at least one monitoring and/or control device, the starting signatures having been previously communicated to said at least one monitoring and/or control device by each of the wheel units with, when the comparison of the signatures is processed by said at least one other wheel unit, transmission of a check report signal from said at least one other wheel unit to said at least one monitoring and/or control device and, when the comparison of the signatures is processed by the monitoring and/or control device, sending of a preliminary signal before comparison by said at least one another wheel unit to said at least one monitoring and/or control device, the preliminary signal containing the predetermined number of power value measurements of the signals sent by the given wheel unit and intercepted by said at least one other wheel unit.

Advantageously, when it is detected that a wheel unit has changed position on the vehicle, an alert message is transmitted by said at least one monitoring and/or control device to a driver of the motor vehicle.

Advantageously, the detection of a change in position of a wheel unit carried by a wheel on a motor vehicle is performed when the motor vehicle is in motion.

Advantageously, what is known as a main wheel unit is selected from among the wheel units as reference wheel unit, its position being known and stored in this main wheel unit and in said at least one monitoring and/or control device, the main wheel unit firstly measuring the power value of each signal received from each remaining given wheel unit for one and the same transmission angle, and secondly measuring a reception angle of rotation of the associated wheel, reached when each signal is intercepted, and then, during each check, for each given wheel unit, at least partially filling in a respective at least two-dimensional table giving, as a function of a reception angle of rotation range of the main wheel unit, power values of the signals averaged over this angle range, an initial table being established following the prior identification of the position of the given wheel unit on the vehicle by forming a starting signature, the power values of the signals averaged over each angle of rotation range in a table created during a check for each given wheel unit having to differ by more than an experimentally determined percentage from the averaged power values of the signals in the initial table for a change in position of a given wheel unit on the vehicle to be detected.

The position of the wheel associated with this what is known as main wheel unit on the motor vehicle is known, and it is postulated that the position of the wheel associated with the main wheel unit has not varied. Detection of the other wheel units sending signals whose power is measured by the main wheel unit is thereby made easier.

Advantageously, the main wheel unit also stores the transmission angles of the wheel associated with each of the remaining given wheel units for each transmission of a signal and, during each check for each given wheel unit, at least partially fills in a respective three-dimensional table giving, as a function of a reception angle of rotation range of the main wheel unit and of a transmission angle range of the signals for a respective given wheel unit that transmitted the signals, power values of the signals, an initial table being established following the prior identification of the position of the given wheel unit on the vehicle by forming a starting signature, the power values of the signals averaged over each reception and transmission angle range in a table created during a check for each other wheel unit having to differ by more than an experimentally determined percentage from the averaged power values of the signals in the initial table for a change in position of the given wheel unit on the vehicle to be detected.

An aspect of the present invention relates to a method for locating a position of a wheel unit on a motor vehicle implementing such a detection method, noteworthy in that the power values of the signals averaged over each reception angle range and, where applicable, over each transmission angle range are different and specific to one of the wheels other than the wheel associated with the main wheel unit, location being performed in accordance with the averaged power values of the signals.

The main wheel unit, already paired with a wheel of the vehicle, is therefore responsible for pairing the other wheel units with a specific wheel. It is possible for the main wheel unit to send, to the monitoring and/or control device or devices of the wheel unit system, a request, to be performed by each wheel unit, to send a plurality of signals containing any information frame, these signals being intercepted by the main wheel unit for the purpose of locating the other wheel units that sent the signals. As an alternative, a request for high-periodicity transmissions may be made in order to form a table of transmission values more quickly. Advantageously, for a four-wheeled vehicle with two wheels mounted on one and the same axle, the wheel unit associated with the wheel mounted on the same axle as the wheel associated with the main wheel unit sends the signals intercepted by the main wheel unit having the highest averaged power values, the wheel unit associated with the wheel mounted on an axle other than and arranged diagonally to the wheel associated with the main wheel unit sends the signals intercepted by the main wheel unit having the lowest averaged power values, and the wheel unit associated with the wheel mounted on an axle other than and aligned longitudinally with the wheel associated with the main wheel unit sends the signals intercepted by the main wheel unit having averaged power values between the other two averaged power values. Advantageously, the transmission angle of the other wheel units is set at +90° or −90° with respect to the ground contact of the associated wheel, or the signals sent by each of the other wheel units incorporate the transmission angle, the transmission of the signals being directed toward the rear of the vehicle.

BRIEF DESCRIPTION OF THE DRAWINGS

Other features, aims and advantages of aspects of the present invention will become apparent on reading the detailed description that follows and on examining the appended drawings given by way of non-limiting example, and in which.

DETAILED DESCRIPTION OF THE PREFERRED EMBODIMENTS

In the following text, the given wheel unit is the signal-transmitting wheel unit for which the position of the associated wheel will be checked, and the other wheel unit or units are wheel units that may be referred to as reference wheel units, performing power measurements on the signals transmitted by the given wheel unit after having intercepted the signals transmitted by the given wheel unit through scanning.

Figure 1:
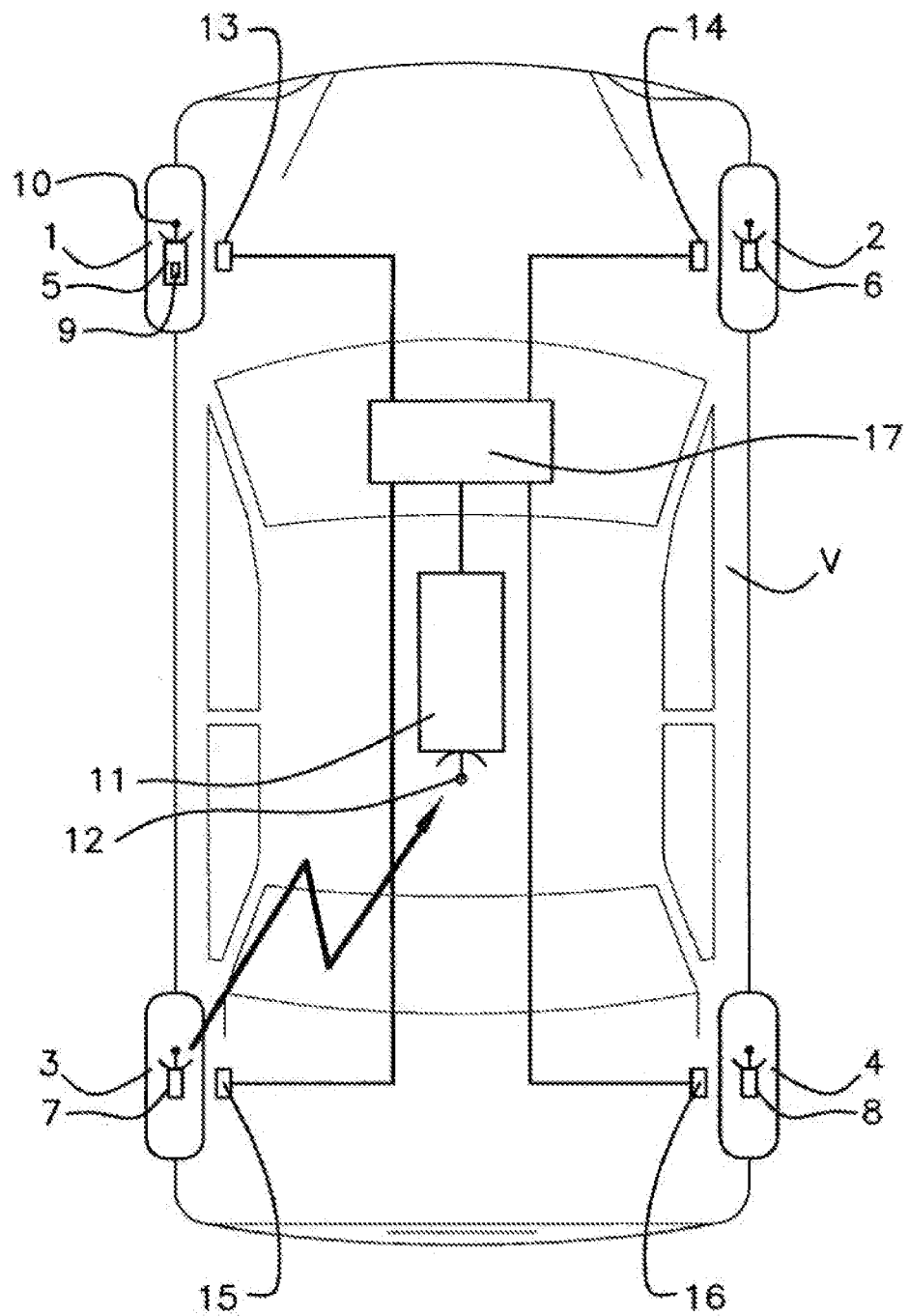
FIG. 1 is a schematic plan view of a vehicle equipped with a monitoring system and, secondarily, an active safety system, allowing implementation of the method for locating the position of the wheels of said vehicle according to an aspect of the invention.

Referring more particularly to FIG. 1, while considering the other figures for the references absent from this FIG. 1, an aspect of the present invention relates to a method for detecting a change in position of a wheel unit 5 to 8 carried by a wheel 1 to 4 associated with a motor vehicle V.

This FIG. 1 shows a vehicle V fitted with four wheels 1 to 4 and equipped with a system for monitoring parameters, such as the pressure or the temperature, of the tires comprising wheel units 5 to 8. Often but secondarily in the context of an aspect of the present invention, the vehicle V is equipped with an active safety system such as an "ABS" wheel anti-lock braking system or an "ESP" dynamic stability control system.

Whilst FIG. 1 shows a motor vehicle with four wheels, it should however be borne in mind that an aspect of the present invention may be applied to a motor vehicle V with more than four wheels, such as a truck for example.

Normally, the monitoring system conventionally comprises, first and foremost, a wheel unit 5 to 8 associated with each wheel 1 to 4, which wheel unit is for example secured to the rim of said wheel so as to be positioned inside the casing of the tire.

Each of these wheel units 5 to 8 integrates sensors dedicated to measuring parameters of the tires, connected to a microprocessor-based computation unit linked to a transmitter 10, only one of which is referenced in FIG. 1.

Each of these electronic wheel units 5 to 8 also integrates, as is conventional, measuring means 9 for measuring the angular position of the corresponding wheel unit 5 to 8. Such measuring means may advantageously consist of an accelerometer able to supply modulated signals representative of the values of gravity, and therefore of the angular position of the electronic housing, and whose frequency, equal to the rotational frequency of the wheels, also makes it possible to calculate the rotational speed of said wheels.

The monitoring system also comprises a central unit 11 situated within the vehicle V, comprising a microprocessor and integrating a receiver 12 able to receive the signals transmitted by the transmitters 10 of each of the four wheel units 5 to 8. The central unit 11 may be used as a remote monitoring and/or control unit, but this is not the only embodiment of a control unit, the control unit being able to be a mobile telephone, a tablet, a computer or a similar electronic appliance.

Each wheel unit 5 to 8 thus measures at least one parameter of the associated wheel 1 to 4 and communicates with the central unit 11. Each wheel unit 5 to 8 may however at least communicate with one or more devices for remotely monitoring and/or controlling the wheel units other than the central unit 11, in particular a mobile telephone equipped with the appropriate application for communicating with the wheel units 5 to 8.

Without being essential in the context of an aspect of the present invention, the "ABS" wheel anti-lock braking system or the "ESP" dynamic stability control system comprises four wheel speed sensors 13 to 16 positioned on the vehicle V, each close to a wheel 1 to 4, and designed to provide data representative of the orientation of said wheel, in the form of values able to be converted into angular values. A module for monitoring/controlling the "ABS" wheel anti-lock braking system or the "ESP" dynamic stability control system is referenced 17.

In the system for monitoring parameters, such as the pressure or the temperature of the tires, comprising wheel units 5 to 8, a position of each wheel unit 5 to 8 on the vehicle V has been previously identified and stored in the respective wheel unit 5 to 8.

According to the prior art, it is known that each wheel unit 5 to 8 fitted on the wheel 1 to 4 to be located delivers a plurality of radiofrequency signals transmitted at successive times for angular positions of the wheel unit 5 to 8 that are offset by angular values that are determined with respect to the angular transmission position of the first signal, this being performed in the direction of the central unit 11 of the monitoring system, but also in the direction of another monitoring and/or control device 11. A wheel unit 5 to 8 transmits at a fixed angle. For example, the diameter of the wheel and/or the winding nature of the road may influence the transmission.

Each of these signals contains in particular the identification code of the wheel unit 5 to 8 and data representative of the angular transmission position. These signals are transmitted for several seconds, generally 15 to 20 seconds, in order firstly to comply with radiofrequency standards, and secondly to allow sufficient desynchronization of the wheels 1 to 4.

According to an aspect of the present invention, the communication between each wheel unit 5 to 8 and said at least one monitoring and/or control device 11 takes place in accordance with a communication standard allowing the bidirectional exchange of data signals at very short distances using Bluetooth® UHF radio waves.

Electromagnetic fields are classified according to their frequencies. When referring to microwave frequencies or UHF radio waves, meaning ultra-high frequency, these are frequencies from 300 MHz to 300 GHz, most microwave sources transmitting in the range from 900 to 2600 MHz or even more.

A low-energy Bluetooth® communication standard is advantageously used so as not to overburden the battery of the wheel unit 5 to 8, such a low-energy Bluetooth® communication standard being known by the name Bluetooth® BLE. Another communication standard for UHF or microwave frequency waves may also be used; what is important is that a scanning function performed by a wheel unit 5 to 8 is guaranteed to intercept signals coming from another wheel unit.

Figure 2:
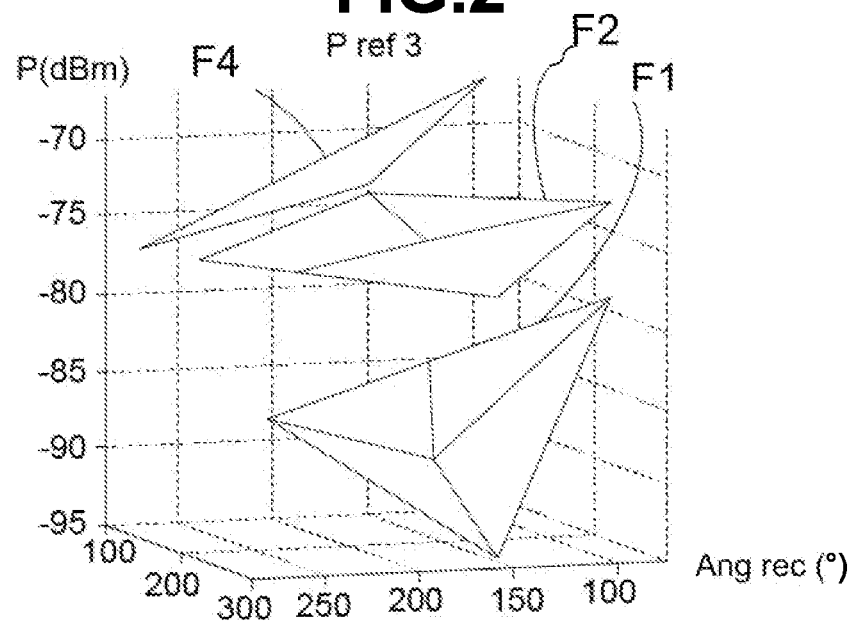
FIG. 2 shows forms of power values for specific wheel units with respect to a reference wheel unit within a transmission angle range.
Figure 3:
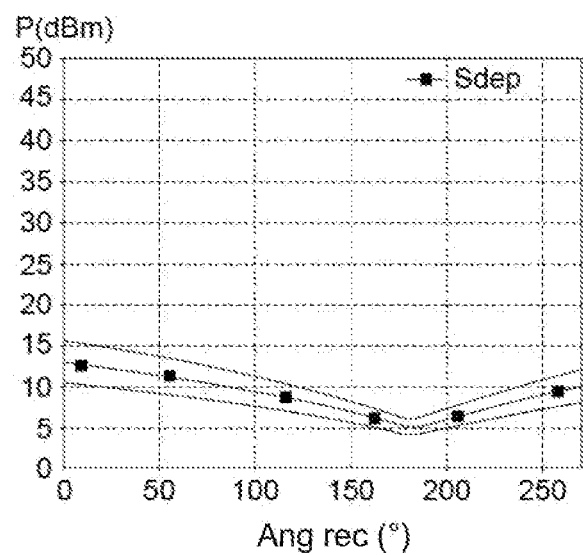
FIG. 3 is a schematic depiction of a starting signature curve created from power values received by a reference wheel unit for one and the same wheel unit under test, the signature curve being framed by two limit curves, a movement of the wheel of the wheel unit under test being detected for signature values outside the two limit curves.
Figure 4:
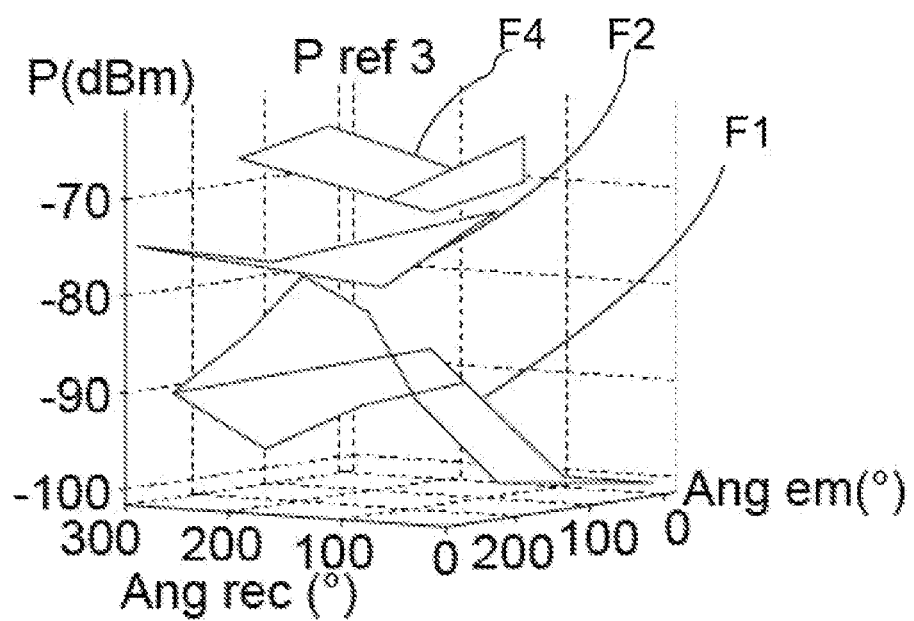
FIG. 4 shows forms of power values for specific wheel units with respect to a reference wheel unit in three dimensions within a transmission angle range and a reception angle range.

As is known, for such a communication standard, each wheel unit 5 to 8 may be equipped with a scanning function allowing it to intercept the signals sent by a given wheel unit to said at least one monitoring and/or control device 11 and perform at least one measurement of a power value P of each intercepted signal, the power P being referenced in FIGS. 2 to 4.

The measured reception power corresponds to the received signal strength indication, also known by the abbreviation RSSI. It is advantageous for the monitoring and/or control device or devices 11 to communicate at transmission with the wheel units 5 to 8 using a Bluetooth® communication standard, advantageously low-energy.

The intercepted signal may not be read by the wheel unit performing the scanning. Only the measurement of the power value P of each intercepted signal is essential in the context of an aspect of the present invention.

A signature of a given wheel unit is thus established with respect to at least one other wheel unit on the basis of an average power value P detected by said at least one other wheel unit established over a predetermined number of power value P measurements of the signals sent by the given wheel unit and intercepted by said at least one other wheel unit, sufficient for the respective wheels of the two wheel units to be phase-offset. This was able to be performed just after a position of each wheel unit 5 to 8 on the vehicle V had been previously identified and stored in the respective wheel unit 5 to 8. A starting signature Sdep, referenced in FIG. 3, is therefore stored.

An aspect of the present invention proposes, in order to detect a change in position of a wheel unit 5 to 8 carried by an associated wheel 1 to 4 on a motor vehicle V, that is to say mainly a change in wheel position on the motor vehicle V, to perform a check consisting in comparing, at regular intervals, a current signature with the starting signature Sdep.

The current signature is averaged over the predetermined number of value measurements for the given wheel unit with respect to said at least one other wheel unit. The starting signature Sdep of the wheel unit 5 to 8 is established with respect to the same other wheel unit or units.

A plurality of starting signatures Sdep and current signatures may be established with respect to each other reference wheel unit that performed the scanning and the power measurements taken for a given wheel unit.

If the averaged current signature of the given wheel differs by more than an experimentally determined percentage from its starting signature Sdep with respect to said at least one other wheel unit, it is detected that one of the wheel units from among the given wheel unit and said at least one other wheel unit has changed position on the vehicle V. This percentage, determined experimentally by routine tests, may be equal to 10% or be greater than 10%.

There is uncertainty as to ascertaining which wheel unit 5 to 8 has changed position from among the given wheel unit or the other wheel unit serving as reference. It is for this reason that it is advantageous for the method to be implemented with a plurality of other reference wheel units for one and the same given wheel unit.

If not, the method is applied to each wheel unit 5 to 8 becoming the given wheel unit with starting signatures Sdep and current signatures for each wheel unit 5 to 8 becoming the given wheel unit, specifically with respect to at least one other reference wheel unit.

With three wheel units, for a given wheel unit and two other reference wheel units, the current signature of a given wheel unit may be compared respectively with its starting signature Sdep for at least two other wheel units, called first and second other wheel units.

In the event of a change in position of a single wheel unit on the vehicle V, if the current signature of the given wheel unit is different from its respective starting signature Sdep with respect to each of the first and second other wheel units, it is detected that the given wheel unit has changed position on the vehicle V, the second wheel unit confirming the change in position detection established by the first wheel unit.

If the current signature of the given wheel unit is different from its respective starting signature Sdep with respect to the first other wheel unit but different from its starting signature by less than the experimentally determined percentage Sdep with respect to the second other wheel unit, therefore that the signatures have remained substantially equal, it is detected that the first other wheel unit has changed position on the vehicle V.

Specifically, the given wheel unit and the second other wheel unit 5 to 8 are consistent in their identification of the starting signatures Sdep and current signatures. Since only one wheel has moved, this may only be the first other reference wheel unit.

In order to make the diagnosis more reliable, the current signature of a given wheel unit may be compared respectively with its starting signature Sdep for all of the other wheel units present on the motor vehicle V by forming starting signature Sdep and current signature pairs for the specific given wheel unit with reference to another wheel unit.

It is thus possible to establish a confidence level that is proportional to a number of other wheel units present on the vehicle V that have communicated the same detection of a change in position of a given wheel unit on the vehicle V.

In order to interpret the average values of the intercepted signals and to create a starting signature Sdep and a current signature, the comparison of the starting signatures Sdep and current signatures for each wheel unit 5 to 8 may be processed by said at least one other reference wheel unit or by said at least one monitoring and/or control device 11.

In the latter case, the starting signatures Sdep may have been previously communicated to said at least one monitoring and/or control device 11 by each of the wheel units, the control device being able to be responsible for creating the starting signatures Sdep and current signatures and for comparing them.

With continuing reference to the latter case, when the comparison of the signatures is processed by the monitoring and/or control device 11, it is possible to send a preliminary signal before comparison by said at least one other wheel unit to said at least one monitoring and/or control device 11, the preliminary signal containing the predetermined number of power value P measurements of the signals sent by the given wheel unit and intercepted by said at least one other wheel unit serving as reference wheel unit 5 to 8.

In the other case, when the comparison of the signatures is processed by said at least one other reference wheel unit, it is possible to send a check report signal from said at least one other wheel unit to said at least one monitoring and/or control device 11 to inform it of the result, that is to say either an identical starting signature Sdep and current signature, in which case the wheel associated with its given wheel unit has not changed position on the motor vehicle V, or different signatures, in which case the wheel associated with its given wheel unit has changed position.

When it is detected that a wheel unit 5 to 8 has changed position on the vehicle V, an alert message may be transmitted by said at least one monitoring and/or control device 11, advantageously the abovementioned central unit, to a driver of the motor vehicle V.

The detection of a change in position of a wheel unit 5 to 8 carried by a wheel 1 to 4 on a motor vehicle V may preferably be performed when the motor vehicle V is in motion.

What is known as a main wheel unit 5 to 8 may be selected from among the wheel units as reference wheel unit, its position being known and stored in the main wheel unit itself and in said at least one monitoring and/or control device 11.

This main wheel unit 5 to 8 may firstly measure the power value P of each signal received from each other wheel unit for one and the same transmission angle. This main wheel unit 5 to 8 may secondly measure a reception angle of rotation of the associated wheel, reached when each signal is intercepted.

With particular reference to FIG. 2, during each check, for each remaining given wheel unit, a respective at least two-dimensional table is at least partially filled in giving, as a function of an angle of rotation range of the main wheel unit, power values P of the signals averaged over this angle range.

An initial or starting table may be established following the prior identification of the position of the given wheel unit on the vehicle V by forming a starting signature Sdep.

FIG. 2, while referring to FIG. 1 for the references absent from FIG. 2, shows power forms F2 to F4, with the power P(dBM) in decibels on the ordinate and reception angles Ang rec in degrees (°) of the main or reference wheel unit on the abscissa, taking, as reference wheel unit or other wheel unit measuring the power, the wheel unit associated with the front left wheel 1 that bears its reference from FIG. 1 or P refl for said power.

Respective forms are obtained for the other three wheels, specifically the form F4 for the rear right wheel, F3 for the rear left wheel and F2 for the front right wheel.

FIG. 3, while referring to FIG. 1, shows three curves including a starting signature Sdep curve bearing squares framed by two curves respectively located at + or −10% of this starting signature Sdep curve, the starting signature Sdep being created from the averaged power values P transmitted by a wheel 1 to 4 given just after identification of its position, with the power P(dBM) in decibels on the ordinate and reception angles Ang rec in degrees (°) on the abscissa.

In this FIG. 3, the power values are displayed between 0 and 50, but they correspond to −100 . . . −50 dBm, with an offset of 100 dBm between the displayed values and the actual values. In order to validate a change in the position of a wheel 1 to 4, the power values P of the signals averaged over each angle of rotation range in a table created during a check for each other wheel unit, thus producing a current signature, have to differ by more than an experimentally determined percentage from the averaged power values P of the signals in the initial table of a starting signature Sdep for a change in position of the other wheel unit on the vehicle V to be detected.

With reference to FIG. 4, while referring to FIG. 1, this FIG. 4 shows power forms F1, F2 and F4 with the power P(dBM) in decibels on the ordinate and firstly transmission angles Ang em in degrees (°) of the given wheel and secondly reception angles Ang rec in degrees (°) of the other reference wheel, which is in this case the rear left wheel referenced 3 in FIG. 1, on the abscissa. The reference power is therefore denoted P ref 3 for the reference rear left wheel.

The reference wheel or another wheel measuring the power is specifically taken to be the rear left wheel, which bears its reference 3 from FIG. 1 for the measured power P ref 3. Respective forms are obtained for the other three wheels, specifically the form F4 for the rear right wheel, F1 for the front left wheel and F2 for the front right wheel.

The main wheel unit may also store the transmission angles of the wheel associated with each of the other wheel units for each transmission of a signal and, during each check for each other wheel unit, at least partially fills in a respective three-dimensional table.

This three-dimensional table gives, as a function of an angle of rotation range of the main wheel unit and of a transmission angle range of the signals for a remaining given wheel unit that transmitted the signals, power values P of the signals, in FIG. 4 P ref 3 for the power measured by the rear left wheel.

An initial table may be established following the prior identification of the position of the given wheel unit on the vehicle V by forming a starting signature Sdep, the power values P of the signals averaged over each reception Ang rec and transmission Ang em angle range in a table created during a check for each other wheel unit having to differ by more than an experimentally determined percentage from the averaged power values P of the signals in the initial table for a change in position of the other given wheel unit on the vehicle V to be detected.

It is possible to take the other reference wheel measuring the signal powers of the other wheels as main wheel, this wheel being the front left wheel in FIG. 2 and the rear left wheel in FIG. 4, and to locate the wheels with respect to this main wheel, the position of which on the vehicle V is known.

For the two embodiments illustrated in FIGS. 2 and 4, the power P of the received signal is measured by the main wheel unit, specifically for a plurality of repeated signals. Since the vehicle V is in motion, it may be possible to classify the received signals in various rotation ranges of said at least one receiving wheel 1 to 4, these ranges being consecutive and varying from 0 to X°, X to 2X° up to at 360°-X°.

A power curve of the signal received by the main wheel unit for each of the transmitter wheel units or other wheel units may be plotted, even if all of the ranges have not been filled in. Each power curve is representative of a given transmitting wheel unit and constitutes its signature.

There is a starting signature Sdep curve and a current signature curve during the check, and it is the result of this comparison between signatures that will detect a change in position if the current signature differs significantly from the starting signature Sdep for one or more reception angle values and, where applicable, transmission angle values.

As soon as said at least one transmitting wheel unit 5 to 8 has been paired with a wheel 1 to 4, a respective signature has been created and stored for at least one rotation range for all of the wheel units, thereby forming the starting signature Sdep.

An aspect of the present invention therefore relates to a method for locating a position of a wheel unit 5 to 8 on a motor vehicle V implementing such a detection method. The power values P of the signals averaged over each reception angle range and, where applicable, over each transmission angle range are different and specific to one of the remaining given wheels other than the wheel associated with the main wheel unit, location being performed according to the averaged power values P of the signals.

For the examples shown in FIGS. 2 and 4, for a four-wheeled vehicle V with two wheels mounted on one and the same axle, the wheel unit 5 to 8 associated with the wheel mounted on the same axle as the wheel associated with the main wheel unit sends the signals intercepted by the main wheel unit having the highest averaged power values P. This is for example the case in FIG. 4 with reference to FIG. 1 for the rear right wheel 4, given that the main wheel measuring the powers is the rear left wheel 3, this not being limiting.

The wheel unit associated with the wheel mounted on an axle other than and arranged diagonally to the wheel associated with the main wheel unit sends the signals intercepted by the main wheel unit having the lowest averaged power values P. This is the case in FIG. 4 with reference also to FIG. 1 for the front right wheel 1, given that the main wheel measuring the powers is the rear left wheel 3.

The wheel unit 5 to 8 associated with the wheel mounted on an axle other than and aligned longitudinally, that is to say in a length of the vehicle V, with the wheel associated with the main wheel unit sends the signals intercepted by the main wheel unit having averaged power values P between the other two averaged power values P. This is the case in FIG. 4 with reference also to FIG. 1 for the front left wheel 1, given that the main wheel measuring the powers is the rear left wheel 3.

The signals are sent at a specific angle of orientation of the wheels. Advantageously, these signals are sent at an angle other than the 0° angle at which the wheel is in contact with the ground, this angle corresponding to an absence of points of lack of transmission or defective transmission of the signal. The angle is preferably determined at plus or minus 90° from this point, that is to say at a point facing an associated front or rear longitudinal wheel 1 to 4, or at a point opposite the associated front or rear longitudinal wheel.

The transmission angle of the other wheel units is thus set at +90° or −90° with respect to the ground contact of the associated wheel, or the signals sent by each of the other wheel units incorporate the transmission angle, the transmission of the signals being directed toward the rear of the motor vehicle V.

The invention claimed is:

1. A method for detecting a change in position of a wheel unit carried by an associated wheel on a motor vehicle, a position of each wheel unit on the vehicle having been previously identified and stored in the respective wheel unit, each wheel unit measuring at least one parameter of the associated wheel and communicating with at least one device for remotely monitoring and/or controlling the wheel units, comprising:

communication between each wheel unit and said at least one monitoring and/or control device takes place in accordance with a communication standard allowing a bidirectional exchange of data signals at very short distances using Bluetooth® UHF radio waves, each wheel unit being equipped with a scanning function allowing it to intercept the signals sent by a given wheel unit to said at least one monitoring and/or control device and to perform at least one measurement of a power value of each intercepted signal, a signature of a given wheel unit being established with respect to at least one other wheel unit on the basis of an average power value detected by said at least one other wheel unit established over a predetermined number of power value measurements of the signals sent by the given wheel unit and intercepted by said at least one other wheel unit, sufficient for the respective wheels of the two wheel units to be phase-offset, a check consisting in comparing, at regular intervals, a current signature averaged over the predetermined number of value measurements for the given wheel unit with respect to said at least one other wheel unit with a starting signature of the given wheel unit with respect to said at least one other wheel unit, this starting signature being established following the prior identification of the position of the given wheel unit on the vehicle, and, if the averaged current signature of the given wheel differs by more than an experimentally determined percentage from its starting signature with respect to said at least one other wheel unit, it is detected that one of the wheel units from among the given wheel unit and said at least one other wheel unit has changed position on the vehicle, the method being applied to each wheel unit becoming the given wheel unit.

2. The method as claimed in claim 1, wherein the current signature of a given wheel unit is compared respectively with its starting signature for at least two other wheel units, called first and second other wheel units, and, in the case of a change in position of a single wheel unit on the vehicle, if the current signature of the given wheel unit is different from its respective starting signature with respect to each of the first and second other wheel units, it is detected that the given wheel unit has changed position on the vehicle, whereas, if the current signature of the given wheel unit is different from its respective starting signature with respect to the first other wheel unit but different from its starting signature by less than the experimentally determined percentage with respect to the second other wheel unit, it is detected that the first other wheel unit has changed position on the vehicle.

3. The method as claimed in claim 2, wherein the current signature of a given wheel unit is compared respectively with its starting signature for all of the other wheel units present on the motor vehicle.

4. The method as claimed in claim 3, wherein a confidence level is established that is proportional to a number of other wheel units present on the vehicle that have communicated the same detection of a change in position of a given wheel unit on the vehicle.

5. The method as claimed in claim 1, wherein the comparison of the starting signatures and the current signatures for each wheel unit is processed by said at least one other wheel unit or by said at least one monitoring and/or control device, the starting signatures having been previously communicated to said at least one monitoring and/or control device by each of the wheel units with, when the comparison of the signatures is processed by said at least one other wheel unit, transmission of a check report signal from said at least one other wheel unit to said at least one monitoring and/or control device and, when the comparison of the signatures is processed by the monitoring and/or control device, sending of a preliminary signal before comparison by said at least one another wheel unit to said at least one monitoring and/or control device, the preliminary signal containing the predetermined number of power value measurements of the signals sent by the given wheel unit and intercepted by said at least one other wheel unit.

6. The method as claimed in claim 5, wherein, when it is detected that a wheel unit has changed position on the vehicle, an alert message is transmitted by said at least one monitoring and/or control device to a driver of the motor vehicle.

7. The method as claimed in claim 1, wherein the detection of a change in position of a wheel unit carried by a wheel on a motor vehicle is performed when the motor vehicle is in motion.

8. The method as claimed in claim 1, wherein what is known as a main wheel unit is selected from among the wheel units as reference wheel unit, its position being known and stored in this main wheel unit and in said at least one monitoring and/or control device, the main wheel unit firstly measuring the power value of each signal received from each remaining given wheel unit for one and the same transmission angle, and secondly measuring a reception angle of rotation of the associated wheel, reached when each signal is intercepted, and then, during each check, for each given wheel unit, at least partially filling in a respective at least two-dimensional table giving, as a function of a reception angle of rotation range of the main wheel unit, power values of the signals averaged over this angle range, an initial table being established following the prior identification of the position of the given wheel unit on the vehicle by forming a starting signature, the power values of the signals averaged over each angle of rotation range in a table created during a check for each given wheel unit having to differ by more than an experimentally determined percentage from the averaged power values of the signals in the initial table for a change in position of a given wheel unit on the vehicle to be detected.

9. The method as claimed in claim 8, wherein the main wheel unit also stores the transmission angles of the wheel associated with each of the remaining given wheel units for each transmission of a signal and, during each check for each given wheel unit, at least partially fills in a respective three-dimensional table giving, as a function of a reception angle of rotation range of the main wheel unit and of a transmission angle range of the signals for a respective given wheel unit that transmitted the signals, power values of the signals, an initial table being established following the prior identification of the position of the given wheel unit on the vehicle by forming a starting signature, the power values of the signals averaged over each reception and transmission angle range in a table created during a check for each other wheel unit having to differ by more than an experimentally determined percentage from the averaged power values of the signals in the initial table for a change in position of the given wheel unit on the vehicle to be detected.

10. A method for locating a position of a wheel unit on a motor vehicle implementing a detection method as claimed in claim 8, wherein the power values of the signals averaged over each reception angle range and, where applicable, over each transmission angle range are different and specific to one of the wheels other than the wheel associated with the main wheel unit, location being performed according to the averaged power values of the signals.

11. The method as claimed in claim 10, wherein, for a four-wheeled vehicle with two wheels mounted on one and the same axle, the wheel unit associated with the wheel mounted on the same axle as the wheel associated with the main wheel unit sends the signals intercepted by the main wheel unit having the highest averaged power values, the wheel unit associated with the wheel mounted on an axle other than and arranged diagonally to the wheel associated with the main wheel unit sends the signals intercepted by the main wheel unit having the lowest averaged power values, and the wheel unit associated with the wheel mounted on an axle other than and aligned longitudinally with the wheel associated with the main wheel unit sends the signals intercepted by the main wheel unit having averaged power values between the other two averaged power values.

12. The method as claimed in claim 8, wherein the transmission angle of the other wheel units is set at +90° or −90° with respect to the ground contact of the associated wheel, or the signals sent by each of the other wheel units incorporate the transmission angle, the transmission of the signals being directed toward the rear of the vehicle.

13. A method for locating a position of a wheel unit on a motor vehicle implementing a detection method as claimed in claim 9, wherein the power values of the signals averaged over each reception angle range and, where applicable, over each transmission angle range are different and specific to one of the wheels other than the wheel associated with the main wheel unit, location being performed according to the averaged power values of the signals.

* * * * *